United States Patent
Toba

(10) Patent No.: US 9,843,278 B2
(45) Date of Patent: Dec. 12, 2017

(54) POWER CONVERSION SYSTEM AND CONTROL METHOD THEREOF

(71) Applicant: FUJI ELECTRIC CO., LTD., Kawasaki-shi (JP)

(72) Inventor: Akio Toba, Hino (JP)

(73) Assignee: FUJI ELECTRIC CO., LTD., Kawasaki-shi (JP)

( * ) Notice: Subject to any disclaimer, the term of this patent is extended or adjusted under 35 U.S.C. 154(b) by 0 days.

(21) Appl. No.: 14/693,281

(22) Filed: Apr. 22, 2015

(65) Prior Publication Data

US 2015/0229252 A1    Aug. 13, 2015

Related U.S. Application Data

(63) Continuation of application No. PCT/JP2013/078907, filed on Oct. 25, 2013.

(30) Foreign Application Priority Data

Nov. 28, 2012    (JP) ................. 2012-259641

(51) Int. Cl.
*H02P 6/14*    (2016.01)
*H02M 7/5387*    (2007.01)
(Continued)

(52) U.S. Cl.
CPC ............ *H02P 6/14* (2013.01); *H02M 3/1582* (2013.01); *H02M 7/5387* (2013.01); *H02M 2001/0067* (2013.01)

(58) Field of Classification Search
CPC .. H02P 2209/01; H02P 27/08; H02P 2101/45; H02P 25/16; H02P 25/18;
(Continued)

(56) References Cited

U.S. PATENT DOCUMENTS 5,397,975 A * 3/1995 Syverson ................ H02J 7/163
                                                            310/181
5,473,227 A * 12/1995 Arnaud ................. B06B 1/0261
                                                            318/139
(Continued)

FOREIGN PATENT DOCUMENTS

CN    1206242 A    1/1999
EP    1206028 A2    5/2002
(Continued)

OTHER PUBLICATIONS

International Search Report issued in PCT/JP2013/078907, dated Jan. 21, 2014. English translation provided.
(Continued)

*Primary Examiner* — Paul Ip
(74) *Attorney, Agent, or Firm* — Rossi, Kimms & McDowell LLP

(57) ABSTRACT

Aspects of a power conversion system can include a capacitor which stores direct current power, an inverter, and a pair of direct current terminals of which are connected to two ends of the capacitor and to the alternating current terminals of which an alternating current motor acting as a load is connected. Also included can be an upper and lower arm portion of which the connection point of semiconductor switches connected in series is connected to the neutral point of the motor, a direct current power source connected in parallel to the upper and lower arm portion and a switch connected between one of the direct current terminals of the inverter and one end of the upper and lower arm portion. The other direct current terminal of the inverter can be connected to the other end of the upper and lower arm portion.

17 Claims, 4 Drawing Sheets

(51) Int. Cl.
*H02M 3/158* (2006.01)
*H02M 1/00* (2006.01)
(58) Field of Classification Search
CPC .......... H02P 25/184; H02P 27/06; H02P 9/02; H02P 9/04; H02P 9/102; H02P 9/107; H02P 9/305
USPC ...... 318/139, 400.04, 400.27, 442; 363/132; 307/9.1
See application file for complete search history.

(56) References Cited

U.S. PATENT DOCUMENTS

| | | | | |
|---|---|---|---|---|
| 5,491,622 | A * | 2/1996 | Carosa | B60L 3/0023 363/132 |
| 5,631,544 | A * | 5/1997 | Syverson | H02J 7/1438 322/46 |
| 6,058,032 | A * | 5/2000 | Yamanaka | B60L 11/1803 318/768 |
| 6,137,704 | A * | 10/2000 | Ito | H02M 5/458 363/132 |
| 6,291,963 | B2 * | 9/2001 | Nakano | B60L 15/08 318/801 |
| 6,320,775 | B1 * | 11/2001 | Ito | H02M 5/458 363/132 |
| 6,630,804 | B2 | 10/2003 | Moriya et al. | |
| 6,806,671 | B2 * | 10/2004 | Kusaka | B60L 1/00 318/108 |
| 7,233,123 | B2 * | 6/2007 | Koczara | H02P 6/185 318/400.01 |
| 7,436,686 | B2 * | 10/2008 | Mavier | H02M 7/53875 363/56.01 |
| 7,609,050 | B2 * | 10/2009 | Stancu | G01R 19/0092 324/120 |
| 7,816,805 | B2 * | 10/2010 | Tanaka | B62D 5/046 307/10.1 |
| 7,859,201 | B2 * | 12/2010 | Oyobe | B60K 6/445 318/105 |
| 7,969,104 | B2 * | 6/2011 | Taniguchi | B62D 5/046 310/198 |
| 8,040,096 | B2 * | 10/2011 | Taniguchi | H02M 1/32 318/490 |
| 8,040,101 | B2 * | 10/2011 | Itoh | B60L 11/18 318/800 |
| 8,053,915 | B2 | 11/2011 | Umeda et al. | |
| 8,063,440 | B2 * | 11/2011 | Yankoski | H01L 25/18 257/330 |
| 8,129,932 | B2 * | 3/2012 | Sakai | B60L 11/1814 318/400.09 |
| 8,198,855 | B2 * | 6/2012 | Fukui | B60K 6/365 180/65.21 |
| 8,301,322 | B2 * | 10/2012 | Mitsutani | B60K 6/365 180/65.21 |
| 8,384,236 | B2 * | 2/2013 | Fuma | B60L 11/123 307/9.1 |
| 8,441,224 | B2 * | 5/2013 | Sumi | B60L 3/04 180/65.265 |
| 2001/0004321 | A1 * | 6/2001 | Nakano | B60L 15/08 363/40 |
| 2002/0070715 | A1 * | 6/2002 | Sasaki | B60K 6/365 322/28 |
| 2003/0057908 | A1 * | 3/2003 | Kusaka | B60L 1/00 318/442 |
| 2003/0067278 | A1 * | 4/2003 | Nakamura | H02P 27/08 318/400.04 |
| 2003/0146726 | A1 * | 8/2003 | Ishikawa | B60L 3/0046 318/442 |
| 2005/0104544 | A1 * | 5/2005 | Ishikawa | B60K 6/44 318/139 |
| 2007/0086226 | A1 * | 4/2007 | Mavier | H02M 7/53875 363/132 |
| 2007/0137908 | A1 * | 6/2007 | Fujiwara | B60K 6/26 180/65.22 |
| 2008/0278102 | A1 * | 11/2008 | Taniguchi | B62D 5/046 318/400.27 |
| 2009/0015185 | A1 * | 1/2009 | Yoshida | B60K 6/26 318/504 |
| 2009/0096394 | A1 * | 4/2009 | Taniguchi | H02M 1/32 318/400.09 |
| 2009/0121659 | A1 * | 5/2009 | Oyobe | B60K 6/445 318/12 |
| 2009/0206781 | A1 * | 8/2009 | Itoh | B60L 11/18 318/400.3 |
| 2009/0251831 | A1 * | 10/2009 | Shiba | B60L 3/003 361/30 |
| 2010/0007306 | A1 * | 1/2010 | Fukui | B60K 6/445 320/107 |
| 2010/0237694 | A1 * | 9/2010 | Fuma | B60L 11/123 307/9.1 |
| 2010/0299008 | A1 * | 11/2010 | Mitsutani | B60K 6/445 701/22 |
| 2010/0302737 | A1 * | 12/2010 | Yankoski | H01L 25/18 361/709 |
| 2011/0031922 | A1 * | 2/2011 | Sakai | H02P 23/22 318/519 |
| 2011/0050136 | A1 * | 3/2011 | Sumi | B60L 3/04 318/400.3 |
| 2011/0266868 | A1 * | 11/2011 | Yamamoto | B60L 3/06 307/24 |
| 2011/0309778 | A1 * | 12/2011 | Iwahori | B60L 7/14 318/400.3 |
| 2012/0286705 | A1 * | 11/2012 | Tanaka | H02P 27/08 318/139 |
| 2013/0002186 | A1 * | 1/2013 | Iwahori | B60L 11/123 318/722 |
| 2013/0094266 | A1 * | 4/2013 | Balpe | H02P 27/08 363/131 |

FOREIGN PATENT DOCUMENTS

| | | |
|---|---|---|
| EP | 2031749 A2 | 3/2009 |
| EP | 2048774 A2 | 4/2009 |
| JP | 2001204196 A | 7/2001 |
| JP | 2002233159 A | 8/2002 |
| JP | 2004120844 A | 4/2004 |
| JP | 2004350478 A | 12/2004 |
| JP | 2009106098 A | 5/2009 |
| JP | 2010098790 A | 4/2010 |
| JP | 2011041336 A | 2/2011 |

OTHER PUBLICATIONS

Waffler et al. "Comparative Evaluation of Soft-Switching Concepts for Bi-directional Buck+Boost DC-DC Converters", The 2010 International Power Electronics Conference, IEEE (2010), pp. 1856-1865.
Office Action issued in Chinese Appln. No. 201380055337.6, dated Aug. 24, 2016. English translation provided.
Extended European Search Report issued in European Appln. No. 13858200.2 dated Feb. 7, 2017.

* cited by examiner

POWER CONVERSION SYSTEM AND CONTROL METHOD THEREOF

CROSS-REFERENCE TO RELATED APPLICATIONS

This application is a continuation of International Application No. PCT/JP2013/078907, filed on Oct. 25, 2013, which is based on and claims priority to Japanese Patent Application No. JP 2012.259641, filed on Nov. 28, 2012. The disclosure of the Japanese priority application and the PCT application in their entirety, including the drawings, claims, and the specification thereof, are incorporated herein by reference.

BACKGROUND

1. Field of the Invention

The present invention relates to a power conversion system for driving a load, such as an alternating current motor, and to a control method of the power conversion system.

2. Related Art

As a power conversion system wherein the voltage of a direct current power source is boosted and supplied to an inverter, and an alternating current motor is driven by the inverter, for example, the heretofore known technology shown in FIG. 4 is known.

In FIG. 4, 10 is a direct current power source, 20 is a current reversible boost converter (DC/DC converter), 21 and 22 are semiconductor switches, 23 is a reactor, 30 is a capacitor, 40 is a three-phase voltage inverter, 41 to 46 are semiconductor switches, and 50 is an alternating current motor. As illustrated in the brackets in FIG. 4, each of the semiconductor switches 21, 22, and 41 to 46 is configured of a semiconductor switching element, such as an IGBT, and a reflux diode connected in reverse parallel thereto.

To give a brief description of an operation of the heretofore known technology, as storage and emission of energy in and from the reactor 23 are repeated by turning on and off the semiconductor switch 22 of the boost converter 20, the voltage of the capacitor 30 is boosted with respect to the voltage of the direct current power source 10. The inverter 40, by turning on and off the semiconductor switches 41 to 46 by, for example, PWM control, converts the direct current voltage of the capacitor 30 to a three-phase alternating current voltage and supplies the three-phase alternating current voltage to the alternating current motor 50.

The heretofore known technology shown in FIG. 4 is described in, for example, Japanese Patent Application Publication No. JP-A-2004-120844 (see FIGS. 2, 5 and 6). Also, the heretofore known technology of FIG. 5 configured so as to boost the voltage of a direct current power source by causing an inverter to operate as a so-called zero-phase converter so that a zero-phase voltage is controlled by the inverter, is known.

In FIG. 5, a direct current power source 10 is connected between a neutral point (the neutral point of a stator winding) 50a of an alternating current motor 50 and a negative side direct current busbar, and the same numbers as in FIG. 4 are given to other components.

In the heretofore known technology, by repeating the operations of turning on and off, for example, the semiconductor switches 42, 44, and 46 in the lower arm of the inverter 40 at the same timing, a zero-phase equivalent circuit, formed of the direct current power source 10, a leakage inductance (a zero-phase inductance) of the alternating current motor 50, and the inverter 40, comes to have substantially the same circuit configuration as the boost converter 20 in FIG. 4, and it is thus possible to control the voltage of the capacitor 30 to a higher value than the voltage of the direct current power source 10. A drive operation of the alternating current motor 50 by the inverter 40 is the same as in FIG. 4.

The heretofore known technology shown in FIG. 5 is described in, for example, Japanese Patent Application Publication No. JP-A-2011-41336 (see FIG. 1).

Meanwhile, FIG. 6 is a circuit diagram showing the heretofore known technology described in Japanese Patent Application Publication No. JP-A-2004-350478 (see FIGS. 1 and 7).

In FIG. 6, 70 is a DC/DC converter which operates as a buck-boost chopper, 71 to 74 are semiconductor switches, and 75 is a reactor, wherein the series circuit of the semiconductor switches 71 and 72 is connected in parallel to a direct current power source 10 and capacitor 31, and the series circuit of the semiconductor switches 73 and 74 is connected in parallel to a capacitor 32 and inverter 40. 11 and 62 are voltage detectors, 61 is a current detector, and 80 is a control circuit.

In the heretofore known technology, the duty ratio of the semiconductor switches 71 and 74 to 72 and 73 of the DC/DC converter 70 is controlled, thereby changing energy stored in the reactor 75, and the voltage of the direct current power source 10 is controlled to a desired size and output to the capacitor 32 side. A circuit substantially the same as in FIG. 6 is also described in *Comparative Evaluation of Soft-Switching Concepts for Bi-directional Buck+Boost Dc-Dc Converters*, p. 1856-1865, The 2010 International Power Electronics Conference (see FIG. 1).

The heretofore known technologies shown in FIGS. 4 and 6 have a problem that the reactors 23 and 75 provided in the respective converters 20 and 70 bring about an increase in circuit size and an increase in cost.

Also, the heretofore known technology of FIG. 5 has a problem that as the inverter 40 is caused to operate as a zero-phase converter by appropriately switching the inverter 40 in the operation of switching the inverter 40 which drives the alternating current motor 50, a boost operation is constantly carried out while the alternating current motor 50 is operating, due to which the loss in the inverter 40 and alternating current motor 50 increases.

Furthermore, in the heretofore known technology of FIG. 5, by adjusting the on-duty of all the semiconductor switches in the upper arm or lower arm of the inverter 40, it is possible to control the direct current voltage of the inverter 40 (the voltage of the capacitor 30) in accordance with the rotation speed of the alternating current motor 50, and it is possible, for example, when the alternating current motor 50 rotates at high speed, to control the direct current voltage of the inverter 40 to a higher value than the voltage of the direct current power source 10, but the degree of freedom of the direct current voltage, and thus the alternating current output voltage, of the inverter 40 is generally low.

Therefore, a problem to be solved in the art is to provide a power conversion system wherein by eliminating the need for a boost reactor and constant boost operation, it is possible to achieve a reduction in the size of the whole system and a loss reduction, and to enhance the degree of freedom of the direct current voltage of an inverter, and a control method of the power conversion system.

SUMMARY OF THE INVENTION

In order to solve the heretofore described problem, a power conversion system includes a power storage device such as a capacitor; an inverter, between the positive and negative direct current terminals of which the power storage device is connected, and between a plurality of alternating current terminals of which a load having an inductance is connected; a first upper and lower arm portion, configured by connecting first and second semiconductor switches in series, of which the connection point of the first and second semiconductor switches is connected to the neutral point of the load; and a direct current power source such as a battery connected in parallel to the first upper and lower arm portion, wherein at least one pair of homopolar terminals, of pairs of homopolar terminals out of the positive and negative direct current terminals of the inverter and the positive and negative terminals of the first upper and lower arm portion, are connected by a switch, and the other pair of homopolar terminals are set at the same potential.

Herein, it is also good that only one pair of homopolar terminals, of pairs of homopolar terminals out of the positive and negative direct current terminals of the inverter and the positive and negative terminals of the first upper and lower arm portion, are connected by a switch, and the other pair of homopolar terminals are directly connected together.

Alternatively, it is also good that pairs of homopolar terminals, of the positive and negative direct current terminals of the inverter and the positive and negative terminals of the first upper and lower arm portion, are connected one pair by each switch, and that one switch is constantly placed in an on state, and the other switch is brought into an on and off operation.

In an example, semiconductor switches configuring the inverter and the first and second semiconductor switches configuring the first upper and lower arm portion are each configured of a semiconductor switching element and a reflux diode connected in reverse parallel thereto.

Also, it is desirable that as the load, an alternating current motor is connected, and that a leakage inductance of the alternating current motor is utilized as a boost inductance.

As a control method of the power conversion system according to the invention, it is possible that by switching the plurality of semiconductor switches configuring the inverter in a condition in which the switch is turned on and the first and second semiconductor switches are turned off, an alternating current voltage is output from the inverter to drive the load.

Also, it is also possible that the switch is turned off, and all the semiconductor switches in the upper arm or lower arm of the inverter are turned on or off at the same time, thereby equivalently configuring a second upper and lower arm portion formed of the series circuit of third and fourth semiconductor switches, and that the first and second semiconductor switches are turned on and off, thereby causing a buck-boost chopper formed of the first upper and lower arm portion, the second upper and lower arm portion, and the inductance of the load to operate, thus charging and discharging the power storage device.

Alternatively, it is also possible that in a condition in which one switch is constantly turned on, the other switch is turned off, and all the semiconductor switches in the upper arm or lower arm of the inverter are turned on or off at the same time, thereby equivalently configuring a second upper and lower arm portion formed of the series circuit of third and fourth semiconductor switches, and that the first and second semiconductor switches are turned on and off, thereby causing a buck-boost chopper formed of the first upper and lower arm portion, the second upper and lower arm portion, and the inductance of the load to operate, thus charging and discharging the power storage device.

Furthermore, by adopting an arrangement such that a switching pattern of the inverter for carrying out a buck-boost operation by the second upper and lower arm portion configures one portion of a switching patter for outputting an alternating current voltage from the inverter to drive the load, it is possible to drive the load with the inverter while carrying out a buck-boost operation for the capacitor.

According to the invention, as the need for a boost reactor is eliminated by utilizing an inductance which a load such as an alternating current motor has, it is possible to reduce the size and price of the whole system. Also, as it is possible to select an operation mode in which the load is driven by an inverter without using a boost operation, a simplification in control is achieved, and a loss reduction is possible, compared with a heretofore known technology wherein a boost operation is constantly carried out.

Furthermore, by enhancing the degree of freedom of the direct current voltage of the inverter, it is possible, when the load is, for example, an alternating current motor, to raise the direct current voltage of the inverter when the motor rotates at high speed, meaning that it is possible to reduce current with the motor set to be of high voltage specifications, and thus achieve a reduction in the diameter of a cable through which to supply power to the motor, a reduction in the size of connection terminals, and the like.

DETAILED DESCRIPTION

Hereafter, a description will be given, along the drawings, of an embodiment of the invention.

Figure 1:
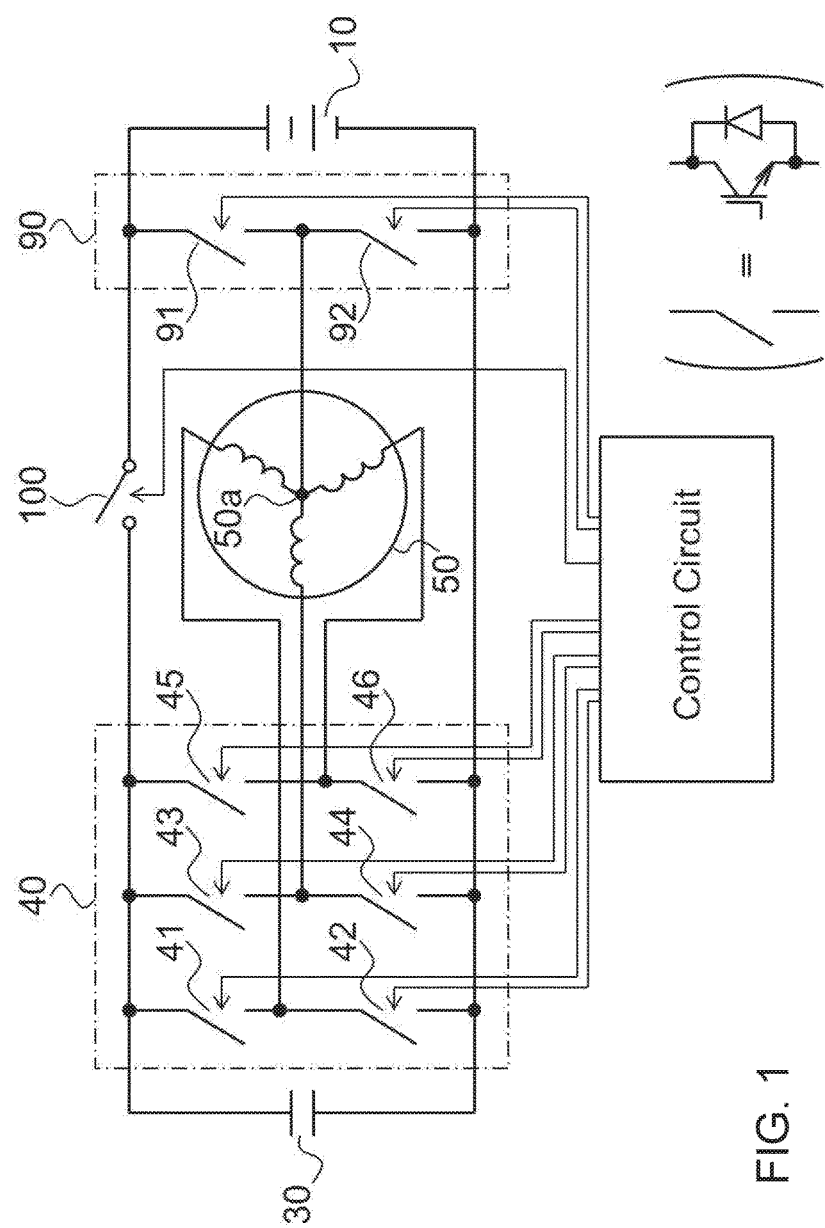
FIG. 1 is a circuit diagram showing an embodiment of the invention.

FIG. 1 is a circuit diagram showing an embodiment of the invention. In FIG. 1, the positive and negative direct current terminals of a three-phase voltage inverter 40 formed of semiconductor switches 41 to 46 are connected one to each end of a capacitor 30 acting as a power storage device, and a three-phase alternating current motor 50 is connected to the alternating current terminals of the inverter 40.

Meanwhile, an upper and lower arm portion 90 wherein semiconductor switches 91 and 92 are connected in series are connected between the positive pole and negative pole of a direct current power source 10 formed of a battery or the like, and the connection point of the semiconductor switches 91 and 92 is connected to a neutral point 50a of the alternating current motor 50. Herein, the semiconductor switches 91 and 92 are called first and second semiconductor switches, and the upper and lower arm portion 90 is called a first upper and lower arm portion.

Also, the positive terminal of the upper and lower arm portion 90 (the positive pole of the direct current power source 10) is connected to one direct current terminal (positive terminal) of the inverter 40 via a switch 100 formed of a bidirectional semiconductor switch or a mechanical switch, while the negative terminal of the upper and lower arm portion 90 (the negative pole of the direct current power source 10) is directly connected to the other direct current terminal (negative terminal) of the inverter 40, and both negative terminals are kept at the same potential.

A configuration may be such that the switch 100 is connected between the negative terminal of the upper and lower arm portion 90 and the negative terminal of the inverter 40, and that the positive terminal of the upper and lower arm portion 90 and the positive terminal of the inverter 40 are directly connected together and kept at the same potential.

Also, although not shown, switches may be connected, one between the positive terminal of the upper and lower arm portion 90 and the positive terminal of the inverter, and the other between the negative terminal of the upper and lower arm portion 90 and the negative terminal of the inverter. In this case, a configuration only has to be such that while a power conversion system is operating, one switch (which corresponds to the switch 100 of the embodiment) is turned on or off by an operation, to be described hereafter, while the other switch is constantly placed in an on state, and both ends of the other switch are kept at the same potential, and that when the power conversion system stops, the other switch is turned off.

In the heretofore described configuration, the semiconductor switches 41 to 46, 91, and 92 are each configured of a semiconductor switching element, such as an IGBT, and a reflux diode connected in reverse parallel thereto, as illustrated in the brackets in FIG. 1.

Next, a description will be given of an operation of the embodiment.

When the switch 100 in FIG. 1 is turned on, and the semiconductor switches 91 and 92 of the upper and lower arm portion 90 are turned off, the direct current power source 10 and the capacitor 30 are connected in parallel to the direct current circuit of the inverter 40, thus configuring an alternating current motor drive system, formed of a common three-phase voltage inverter, as the whole circuit. Because of this, the inverter 40, by carrying out PWM control or the like in accordance with a predetermined voltage command given from the control circuit of FIG. 1 and thus turning on and off the semiconductor switches 41 to 46, converts a direct current voltage to a three-phase alternating current voltage and supplies the three-phase alternating voltage to the alternating current motor 50.

Figure 2:
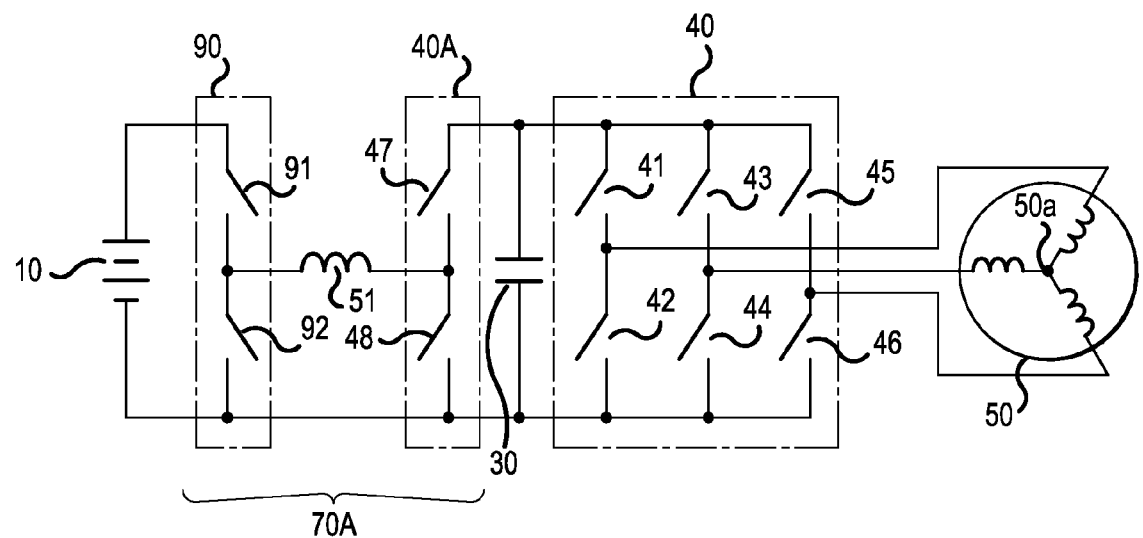
FIG. 2 is an equivalent circuit diagram of FIG. 1.

Next, when a switching operation wherein all the semiconductor switches in the upper arm or lower arm of the inverter 40 are turned on or off to control a zero-phase voltage (the inverter 40 is caused to operate as a zero-phase converter), and a switching operation of the inverter 40 by a positive phase voltage command, are carried out in a time-division manner in a condition in which the switch 100 is turned off, the circuit in FIG. 1 changes equivalently to the kind of circuit in FIG. 2.

In FIG. 2, 40A is an upper and lower arm portion which equivalently shows the inverter 40 acting as a zero-phase converter, and an upper-arm semiconductor switch 47 corresponds to the semiconductor switches 41, 43, and 45 in FIG. 1 which are turned on or off at the same time, while a lower-arm semiconductor switch 48 corresponds to the semiconductor switches 42, 44, and 46 in FIG. 1 which are turned off or on at the same time. Herein, the semiconductor switches 47 and 48 configuring the upper and lower arm portion 40A are called third and fourth semiconductor switches, and the upper and lower arm portion 40A is called a second upper and lower arm portion.

With the circuit configuration shown in FIG. 1, the connection point of the semiconductor switches 47 and 48 in FIG. 2 is connected to the connection point of the semiconductor switches 91 and 92 of the upper and lower arm portion 90 via a leakage inductance (a zero-phase inductance) 51 of the alternating current motor 50, and a buck-boost converter 70A is configured of the upper and lower arm portions 40A and 90 and the leakage inductance 51.

Figure 3:
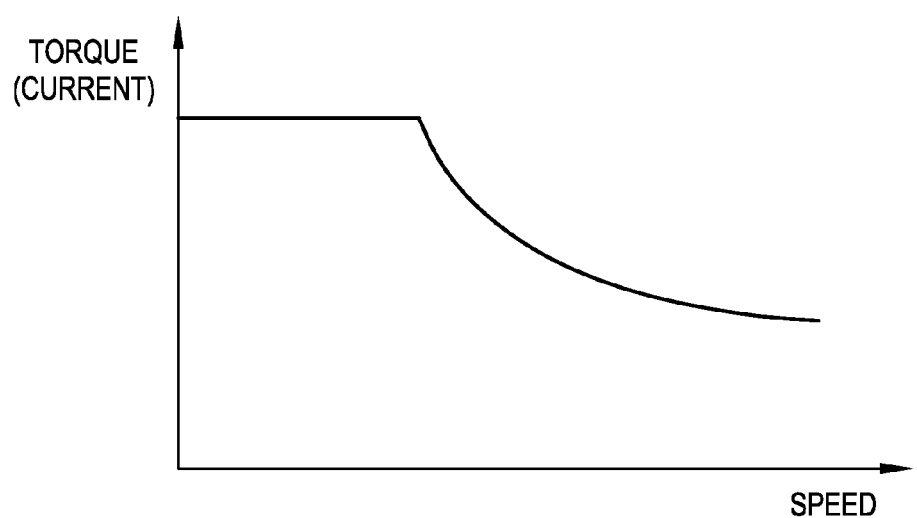
FIG. 3 is a schematic characteristic diagram showing a relationship between the speed and torque (current) of an alternating current motor.
Figure 6:
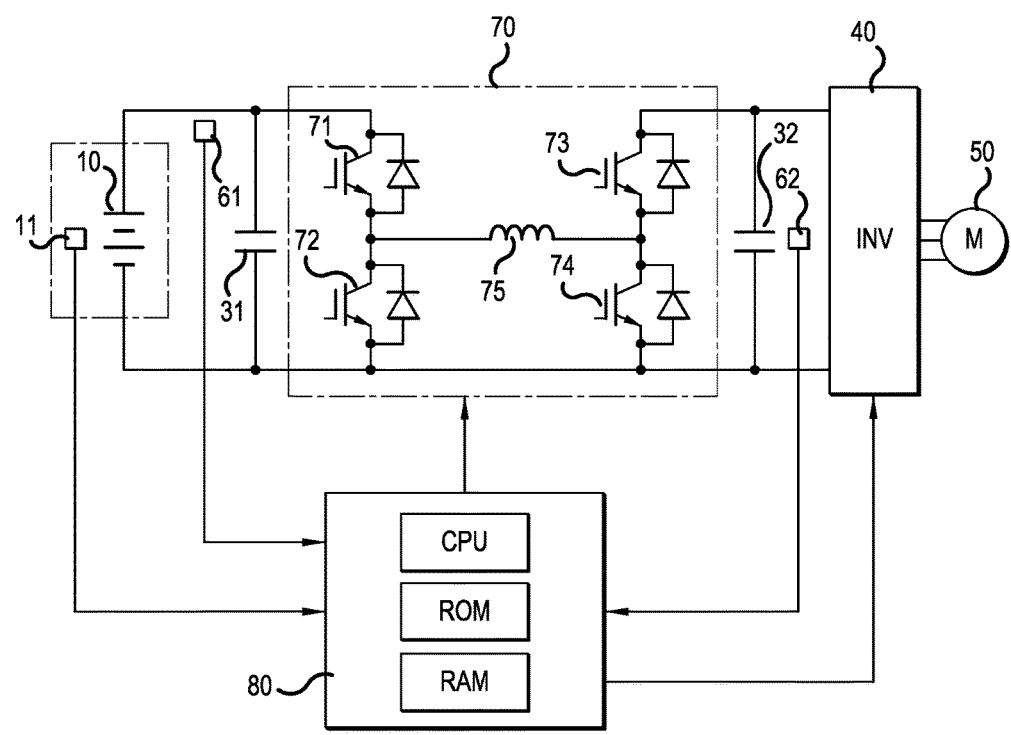
FIG. 6 is a circuit diagram showing a heretofore known technology.

The circuit shown in FIG. 2 is substantially the same in overall configuration as the previously described circuit in FIG. 6, and the buck-boost converter 70A in FIG. 2 has the same function as circuits described in, for example, FIG. 3 in Japanese Patent No. 3,666,557 and FIGS. 1 and 2 in Japanese Patent No. 5,029,315.

As is obvious from these pieces of known literature, when the positive phase voltage command and the zero-phase voltage command are synthesized and given to the semiconductor switches 41 to 46 configuring the inverter 40 in FIG. 1, it is possible, firstly, to convert the voltage of the capacitor 30 to a three-phase alternating current voltage by a normal inverter operation in accordance with the positive phase voltage command, and apply the three-phase alternating current voltage to the alternating current motor 50.

Also, the zero-phase voltage of the inverter 40 is controlled in accordance with the zero-phase voltage command, and zero-phase power is exchanged between the direct current power source 10 and the capacitor 30 by the switching operations of the upper and lower arm portion 40A acting as an equivalently configured zero-phase converter and of the other upper and lower arm portion 90, thus enabling a buck-boost operation to be carried out. For example, when the semiconductor switches 42, 44, and 46 in the lower arm of the inverter 40 in FIG. 1 are turned on at the same time (the semiconductor switch 48 in FIG. 2 is turned on), and the semiconductor switch 91 of the upper and lower arm portion 90 is turned on, by the zero-phase voltage command, energy is stored in the leakage inductance 51 from the direct current power source 10. Next, when the semiconductor switches 42, 44, and 46 in the lower arm of the inverter 40 in FIG. 1 are turned off at the same time (the semiconductor switch 48 in FIG. 2 is turned off) and the semiconductor switch 91 is turned off, the energy stored in the leakage inductance 51 is supplied to the capacitor 30 via the reflux diodes of the semiconductor switches 41, 43, and 45 (the semiconductor switch 47 in FIG. 2) and the reflux diode of the semiconductor switch 92, meaning that it is possible to charge the capacitor 30. When turning off the semiconductor switches 42, 44, and 46 at the same time, the semiconductor switch 91 may be maintained in an on state.

That is, the buck-boost converter 70A in FIG. 2 is such that the semiconductor switches 47 and 48 of the upper and lower arm portion 40A and the semiconductor switches 91 and 92 of the upper and lower arm portion 90 in FIGS. 1 and 2 are turned on and off, thereby causing current to flow from the direct current power source 10 to the leakage inductance 51 in FIG. 2 and thus storing energy in the leakage inductance 51, and furthermore, the energy is supplied to the capacitor 30 via the reflux diodes of the semiconductor switches 47 and 92 in FIG. 2, meaning that it is possible to charge the capacitor 30 using the energy of the direct current power source 10.

Herein, the semiconductor switches 91 and 92 of the upper and lower arm portion 90 and the leakage inductance 51 operate as a buck chopper, and the semiconductor switches 47 and 48 of the upper and lower arm portion 40A and the leakage inductance 51 operate as a boost chopper. Therefore, by adjusting the duty ratio of the semiconductor switches 91, 92, 47, and 48 configuring the buck and boost choppers, it is possible to control the direct current voltage of the inverter 40 (the voltage of the capacitor 30), and thus the alternating current output voltage of the inverter 40, with respect to the voltage of the direct current power source 10 at a high degree of freedom.

Figure 5:
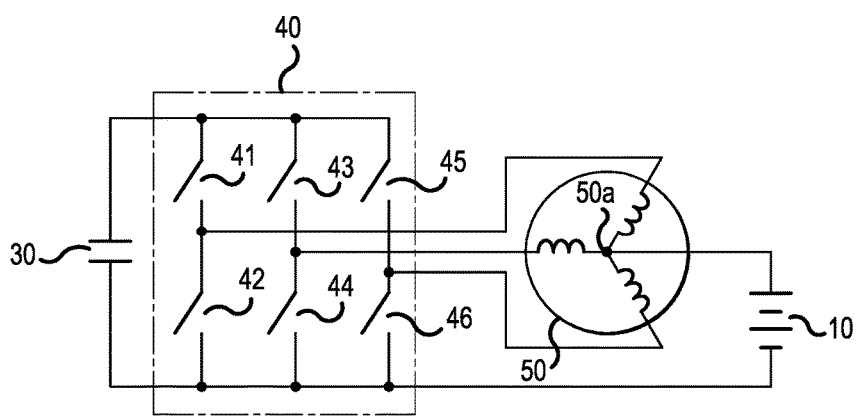
FIG. 5 is a circuit diagram showing a heretofore known technology.

In the embodiment, as heretofore described, in a condition in which the switch 100 in FIG. 1 is turned on and the semiconductor switches 91 and 92 of the upper and lower arm portion 90 are turned off, it is possible to drive the alternating current motor 50 by the normal operation of the inverter 40 to which the direct current power source 10 is directly connected. As no boost operation is carried out in this operation mode, control is simplified, and no loss occurs either due to the neutral point current of the alternating current motor 50, compared with a heretofore known technology wherein the boost operation is constantly carried out while the inverter 40 is operating, as in FIG. 5.

Also, when turning off the switch 100 in FIG. 1 and thus causing the inverter 40 to operate as a zero-phase converter, and switching the semiconductor switches 91 and 92 of the upper and lower arm portion 90, it is possible to carry out a buck-boost operation utilizing the leakage inductance 51 even without using a reactor, as heretofore known, meaning that it is possible to reduce the size and price of the whole system.

At the same time, as the buck-boost converter 70A is caused to operate as a buck-boost chopper, as previously described, the degree of freedom of the direct current voltage of the inverter 40 is high, and it is thus possible to output a desired size of alternating current voltage to drive the alternating current motor 50.

Figure 4:
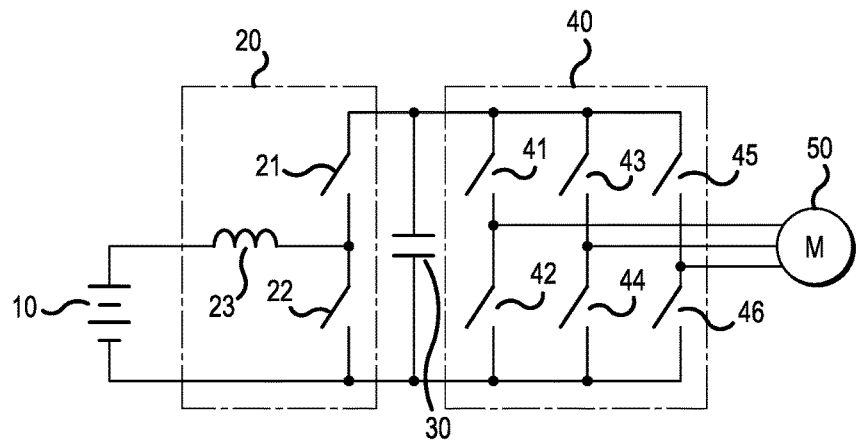
FIG. 4 is a circuit diagram showing a heretofore known technology.

Furthermore, as a permanent magnet synchronous motor used in, for example, an electric vehicle or a hybrid car, in general, having the kinds of speed-torque characteristics shown in FIG. 3, is such that the current of the motor is substantially proportional to the torque, it may be conceivable that the speed-current characteristics of the motor are also substantially the same as in FIG. 4.

According to FIG. 3, as less current is needed in a higher speed region of the motor, in other words, there is much room for being able to cause the neutral point current (zero-phase current) to flow with respect to a preset heat generation amount, the embodiment is suitable for a kind of case in which a boost operation is carried out in a high speed region which does not require so much torque.

As the terminal voltage of the alternating current motor, in general, rises along with an increase in rotation speed, in the event that it is possible to carry out a boost operation, it is possible, in accordance therewith, to design the terminal voltage of the motor to be a high voltage. As a result of this, current flowing through the motor is suppressed, thus enabling a contribution to a reduction in the diameter of a cable through which to supply power to the motor, a reduction in the size of connection terminals and semiconductor elements, and a reduction in the size, weight, and cost of the whole system owing to the reduced volume.

The invention can be utilized in each kind of drive system wherein a load is driven by an inverter, including an in-vehicle power conversion system mounted on, for example, an electric vehicle or hybrid car.

What is claimed is:

1. A power conversion system, comprising:
    a power storage device which stores direct current power,
    an inverter having a positive direct current terminal, a negative direct current terminal, and a plurality of alternating current terminals, the power storage device being connected between the positive direct current terminal and the negative direct current terminal, and a load having a leakage inductance being connected between the plurality of alternating current terminals;
    a control circuit configured to turn switches included in the inverter on and off;
    a first upper and lower arm portion, configured by connecting first and second semiconductor switches in series, the connection point of the first and second semiconductor switches being connected to a neutral point of the load; and
    a direct current power source connected in parallel to the first upper and lower arm portion,
    wherein at least one pair of homopolar terminals, among pairs of terminals of the positive and negative direct current terminals of the inverter and positive and negative terminals of the first upper and lower arm portion, are connected by a switch, and the other pair of homopolar terminals among the positive and negative direct current terminals of the inverter and the positive and negative terminals of the first upper and lower arm portion are set at the same potential,
    wherein in a first case where the switch connecting the at least one pair of homopolar terminals is off, one of the first and second semiconductor switches included in the first upper and lower arm portion is on and connected to a first end of the leakage inductance of the load, first switches included in the inverter are on, thereby equivalently configuring a first equivalent switch, in an on-state, connected to a second end of the leakage inductance of the load, and energy from the direct current power source is stored in the leakage inductance of the load; and
    wherein in a second case where the switch connecting the at least one pair of homopolar terminals is off, the other one of the first and second semiconductor switches included in the first upper and lower arm portion is on and connected to the first end of the leakage inductance of the load, second switches included in the inverter are on, thereby equivalently configuring a second equivalent switch, in an on-state, connected to the second end of the leakage inductance of the load, and energy stored in the leakage inductance of the load is supplied to the power storage device.

2. The power conversion system according to claim 1, wherein
    only one pair of homopolar terminals, of pairs of homopolar terminals out of the positive and negative direct current terminals of the inverter and the positive and negative terminals of the first upper and lower arm portion, are connected by a switch, and the other pair of homopolar terminals are directly connected together.

3. The power conversion system according to claim 2, wherein
    the switch connecting the at least one pair of homopolar terminals is turned off, the first and second switches of the inverter are turned on or off at the same time, thereby equivalently configuring a second upper and lower arm portion formed of a series circuit of the first equivalent switch and the second equivalent switch, and that the first and second semiconductor switches are turned on and off, thereby causing a buck-boost chopper formed of the first upper and lower arm portion, the second upper and lower arm portion, and the leakage inductance of the load to operate, thus charging and discharging the power storage device.

4. The power conversion system according to claim 3, wherein
a switching pattern of the inverter for carrying out a buck-boost operation by the second upper and lower arm portion configures one portion of a switching pattern for outputting an alternating current voltage from the inverter to drive the load.

5. The power conversion system according to claim 1, wherein
both pairs of homopolar terminals, of the positive and negative direct current terminals of the inverter and the positive and negative terminals of the first upper and lower arm portion, are connected by respective switches.

6. The power conversion system according to claim 5, wherein
in a condition in which one switch of the respective switches is constantly turned on, the other switch of the respective switches is turned off, and the first and second switches of the inverter are turned on or off at the same time, thereby equivalently configuring a second upper and lower arm portion formed of a series circuit of the first equivalent switch and the second equivalent switch, and that the first and second semiconductor switches are turned on and off, thereby causing a buck-boost chopper formed of the first upper and lower arm portion, the second upper and lower arm portion, and the leakage inductance of the load to operate, thus charging and discharging the power storage device.

7. The power conversion system according to claim 6, wherein
a switching pattern of the inverter for carrying out a buck-boost operation by the second upper and lower arm portion forms one portion of a switching pattern for outputting an alternating current voltage from the inverter to drive the load.

8. The power conversion system according to claim 1, wherein
semiconductor switches configuring the first and second switches of the inverter and the first and second semiconductor switches configuring the first upper and lower arm portion are each configured of a semiconductor switching element and a reflux diode connected in reverse parallel thereto.

9. The power conversion system according to claim 1, wherein
the load is an alternating current motor.

10. The power conversion system according to claim 1, wherein
the first and second switches of the inverter are configured by a plurality of semiconductor switches, and by switching the plurality of semiconductor switches in a condition in which the switch connecting the at least one pair of homopolar terminals is turned on and the first and second semiconductor switches are turned off, an alternating current voltage is output from the inverter to drive the load.

11. The power conversion system according to claim 10, wherein
a switching pattern of the inverter for carrying out a buck-boost operation by the second upper and lower arm portion configures one portion of a switching pattern for outputting an alternating current voltage from the inverter to drive the load.

12. The power conversion system according to claim 1, wherein in the second case where the switch connecting the at least one pair of homopolar terminals is off, the one of the first and second semiconductor switches included in the first upper and lower arm portion connected to the first end of the leakage inductance of the load is off, and the first switches included in the inverter are off, thereby placing the first equivalent switch connected to the second end of the leakage inductance of the load in an off-state.

13. The power conversion system according to claim 1, wherein in the second case where the switch connecting the at least one pair of homopolar terminals is off, the one of the first and second semiconductor switches included in the first upper and lower arm portion connected to the first end of the leakage inductance of the load is on, and the first switches included in the inverter are off, thereby placing the first equivalent switch connected to the second end of the leakage inductance of the load in an off-state.

14. A power conversion system, comprising:
a power storage device configured to store power;
an inverter having a positive direct current terminal, a negative direct current terminal, and a plurality of alternating current terminals, the power storage device being connected between the positive and negative direct current terminals, and the plurality of alternating current terminals being connected to a load having a leakage inductance;
a control circuit configured to turn switches included in the inverter on and off;
a first upper and lower arm portion including a first semiconductor switch and a second semiconductor switch connected in series, a first side of the first semiconductor switch and a first side of the second semiconductor switch being connected to each other and to a neutral point of the load;
a direct current power source connected in parallel to the first upper and lower arm portion such that a second side of the first semiconductor switch is connected to a positive pole of the direct current power source, and a second side of the second semiconductor switch is connected to a negative pole of the direct current power source; and
a switch connecting the second side of the first semiconductor switch and the positive direct current terminal of the inverter,
wherein in a first case where the switch connecting the second side of the first semiconductor switch and the positive direct current terminal of the inverter is off, one of the first and second semiconductor switches included in the first upper and lower arm portion is on and connected to a first end of the leakage inductance of the load, first switches included in the inverter are on, thereby equivalently configuring a first equivalent switch, in an on-state, connected to a second end of the leakage inductance of the load, and energy from the direct current power source is stored in the leakage inductance of the load; and
wherein in a second case where the switch connecting the second side of the first semiconductor switch and the positive direct current terminal of the inverter is off, the other one of the first and second semiconductor switches included in the first upper and lower arm portion is on and connected to the first end of the leakage inductance of the load, second switches included in the inverter are on, thereby equivalently configuring a second equivalent switch, in an on-state, connected to the second end of the leakage inductance of the load, and energy stored in the leakage inductance of the load is supplied to the power storage device.

15. The power conversion system according to claim 14, wherein the switch connecting the second side of the first semiconductor switch and the positive direct current terminal of the inverter is directly connected to the second side of the first semiconductor switch and the positive direct current terminal of the inverter.

16. A power conversion system, comprising:
a power storage device configured to store power;
an inverter having a positive direct current terminal, a negative direct current terminal, and a plurality of alternating current terminals, the power storage device being connected between the positive and negative direct current terminals, and the plurality of alternating current terminals being connected to a load having a leakage inductance;
a control circuit configured to turn switches included in the inverter on and off;
a first upper and lower arm portion including a first semiconductor switch and a second semiconductor switch connected in series, a first side of the first semiconductor switch and a first side of the second semiconductor switch being connected to each other and to a neutral point of the load;
a direct current power source connected in parallel to the first upper and lower arm portion such that a second side of the first semiconductor switch is connected to a positive pole of the direct current power source, and a second side of the second semiconductor switch is connected to a negative pole of the direct current power source, and
a switch connecting the second side of the second semiconductor switch and the negative direct current terminal of the inverter,
wherein in a first case where the switch connecting the second side of the second semiconductor switch and the negative direct current terminal of the inverter is off, one of the first and second semiconductor switches included in the first upper and lower arm portion is on and connected to a first end of the leakage inductance of the load, first switches included in the inverter are on, thereby equivalently configuring a first equivalent switch, in an on-state, connected to a second end of the leakage inductance of the load, and energy from the direct current power source is stored in the leakage inductance of the load; and
wherein in a second case where the switch connecting the second side of the second semiconductor switch and the negative direct current terminal of the inverter is off, the other one of the first and second semiconductor switches included in the first upper and lower arm portion is on and connected to the first end of the leakage inductance of the load, second switches included in the inverter are on, thereby equivalently configuring a second equivalent switch, in an on-state, connected to the second end of the leakage inductance of the load, and energy stored in the leakage inductance of the load is supplied to the power storage device.

17. The power conversion system according to claim 16, wherein the switch connecting the second side of the second semiconductor switch and the negative direct current terminal of the inverter is directly connected to the second side of the second semiconductor switch and the negative direct current terminal of the inverter.

* * * * *